United States Patent Office 3,308,126
Patented Mar. 7, 1967

3,308,126
PROCESS FOR PREPARING CYCLOHEXIMIDE ESTERS
Francis Johnson, Newton Lower Falls, Mass., assignor to The Dow Chemical Company, Midland, Mich., a corporation of Delaware
No Drawing. Filed Mar. 22, 1963, Ser. No. 267,329
9 Claims. (Cl. 260—281)

The present invention is directed to a synthetic process for preparing cycloheximides and related compounds.

Cycloheximide is an antibiotic which has been isolated from *Streptomyces griseus*.

It is an object of this invention to provide a process for preparing synthetic cycloheximide esters. It is also an object of this invention to provide a process for preparing synthetic monoacylated alcohols. It is a further object of this invention to provide a process for preparing synthetic dialcohols.

I discovered a process for preparing cycloheximide esters starting with a dehydrocycloheximide, by (1) reducing said compound to the corresponding dialcohol, (2) monoacylating this dialcohol to obtain a monoester, and (3) oxidizing this monoester to the corresponding monoester of the ketone-containing cycloheximide. The process steps are depicted schematically as follows:

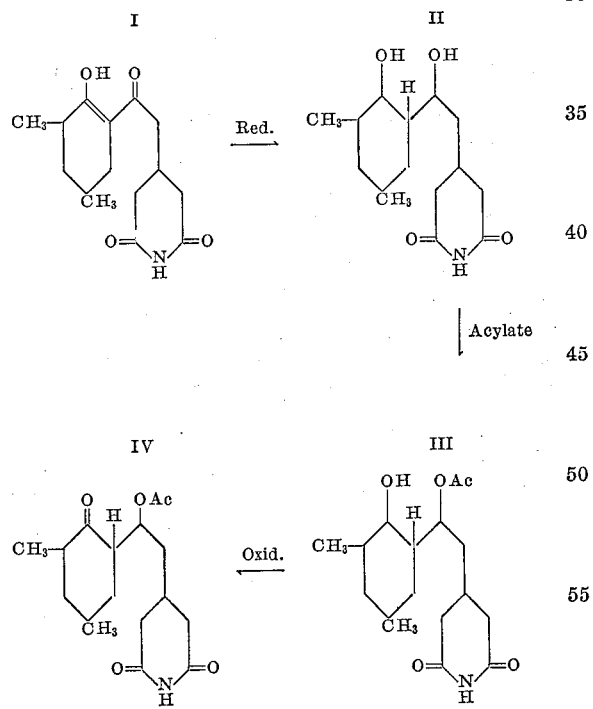

The process illustrated in the preceding paragraph in connection with the preparation of cycloheximide acetate is also applicable to the preparation of esters from other dehydrocycloheximides which have an alkyl substituent adjacent to the ring enol. The reactant dehydrocycloheximide type compounds and the product cycloheximide ester type compounds broadly, have the following structure:

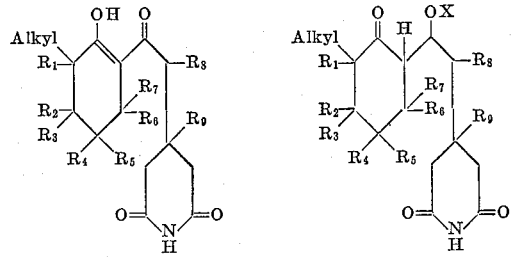

The alkyl substituent (noted as "alkyl" in the formulae) may be an alkyl up to 18 carbon atoms such as lauryl; or octodecyl. It is preferably a lower alkyl, such as methyl, ethyl, butyl, or isooctyl. The R groups may be any substituents which do not react with the reagents or solvents utilized during the synthesis and which do not spatially interfere with the reaction. These groups broadly include hydrocarbons and in particular alkyls, aryls, substituted hydrocarbons, dialkylamines, the alkoxyl and aryloxy groups, etc. They may also include the halogens. The preferred R groups are hydrogen, lower alkyls, and lower alkoxy, e.g. methyl, 4-chlorobutyl, octyl, 3-methoxyoctyl, methoxy, butoxy, etc. It is also preferred that there should be at least one hydrogen substituent on each ring carbon of both the glutarimide and the cyclohexanone moieties. X is an acyl group. It is the acyl residue of the acylating agent.

Dehydrocycloheximide is the common name of the stereoisomer of the compound having the structural Formula I hereinbefore, in which one methyl group is above the plane of the cyclohexanone ring and the second methyl group is below the plane of the ring. The term "a dehydrocycloheximide" is used broadly herein to include related substituted compounds and their sterioisomers, e.g., it is meant to include dehydroisocycloheximide, in which both methyl groups are on the same side of the cyclohexanone ring.

The dehydrocycloheximide reactant is represented in the enolic form herein. Actually this form is believed to be in equilibrium with the diketone as follows:

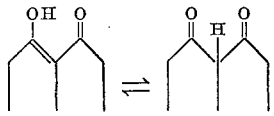

For simplicity, the use of the enolic representation is meant to include the equilibrium diketone. The process is operative using either optically active dehydrocycloheximide derived from natural sources, or using synthetic dl-dehydrocycloheximide, such as that prepared by the process disclosed in the Francis Johnson and Alexander C. Paton application Serial No. 149,174, filed November 1, 1961, now U.S. Patent No. 3,153,041, which is by this reference incorporated herein. Their process broadly involves reacting a glutarimide β-acetyl halide with an enamine of a cyclohexanone in a non-protonic solvent containing a base, to form the acylated enamine and then treating said acylated enamine in an aqueous solution having a pH between 3 and 7. A dehydroisocycloheximide reactant may be prepared by the process disclosed in Francis Johnson and Arthur A. Carlson application Ser. No. 196,617, filed May 22, 1962, now U.S. Patent No. 3,162,638, which is by this reference incorporated herein. Their process broadly involves reacting (1) a benzyl β-keto ester having a hydrogen atom in the alpha position, with (2) a 3-glutarimidyl acetyl chloride, in the presence of (3) phenylmagnesium bromide, and then reducing and decarboxylating, to obtain the dehydroisocycloheximide. When an optically active dehydrocycloheximide reactant is used, the product (1) dialcohol, (2) the monoester of the alcohol, and (3) the ester of cycloheximide, are also optically active. When a racemic dehydrocycloheximide reactant is used, the products of the process are also racemic.

The selective reduction of the reactant dehydrocycloheximide to the dialcohol is a hydrogenation in the presence of a platinum, rhodium, or nickel catalyst, in an organic acid ester, or alcohol solvent. Platinum catalysts are preferred. The useful organic acid solvents include acetic acid, lauric acid, octanoic acid, oleic acid, lactic acid, etc. The organic ester solvents include butyl formate, ethyl acetate, ethyl butyrate, etc. The alcohol solvents include methyl alcohol, ethyl alcohol, butyl alcohol, amyl alcohol, octyl alcohol, lauryl alcohol, ethyleneglycol, propyleneglycol, glyceryl, etc. Acetic acid is the preferred solvent. Atmospheric pressures and temperatures including room temperature are operative for the hydrogenation.

The monoacylation occurs readily and preferentially at the hydroxy substituent of the glutarimidyl moiety. Generally, the larger the acyl group, the more exclusively it acylates the desired hydroxyl group. When polyacylation does occur, it occurs consecutively on the side chain —OH group, then on the cyclohexyl ring —OH group, and finally it may occur at the imide nitrogen atom. All conventional acylating agents, and in particular the known acyl halides and their corresponding anhydrides and esters may be employed. These include acetyl chloride, benzoyl chloride, chloroacetyl chloride, formyl fluoride, p-toluenesulfonyl chloride, and the alkyl and aryl chloroformate esters. Preferred acylating agents are acetyl chloride, and p-toluenesulfonyl chloride. With the preferred p-toluenesulfonyl chloride, only the desired monoacyl product was obtained even when using an amount of the sulfonyl chloride in excess of the stoichiometric amount. The process may be carried out at atmospheric pressure. The acylation occurs over a wide range of temperatures; the preferred temperature varying with the particular acylating agent utilized. With acetyl chloride, low temperature in the order of around 0° are required to obtain predominantly the monoacyl product. With the less reactive larger sized acyl chlorides, room temperatures are more satisfactory. Although higher temperatures may be utilized, they tend to give some dehydrated product. The acylation reaction is carried out in the presence of an acid accepting base such as the inorganics, sodium hydroxide, sodium carbonate, etc., or the preferred organic amine containing bases, e.g. pyridine, dimethylaniline, and triethylamine.

The final oxidation occurs readily, even in the presence of a large excess of oxidizing agent. All conventional oxidizing agents may be used. Illustrative of the useful oxidizing agents are potassium dichromate, nitric oxide, and permanganate. Strong oxidizing agents such as the chromic oxides, sodium dichromate, etc. are preferred. The oxidation is carried out in a solvent that is inert to the reactants and reaction products. Preferred solvents are glacial acetic acid, aqueous acetic acid, aqeous acetone which may be acidified with sulfuric acid, and water. The temperature should be maintained below about 100° C. The lower limit is not critical. However at temperatures as low as —20° C. and lower, the oxidation is slowed considerably. Temperatures between about 0° and 50° C. are preferred.

The following examples are given to further illustrate the invention.

*Example I.—Reduction of dehydrocycloheximide*

Dl-dehydrocycloheximide (2.8 g.; M.P. 174–5°) in acetic acid (50 ml.) was added to prereduced platinum oxide (0.45 g.) in acetic acid (50 ml.). The total mixture was shaken with hydrogen until uptake of gas (2 equivalents) ceased (12 hours). The mixture was filtered to remove catalyst and the acetic acid removed under reduced pressure. The residual glass was triturated with ether and the solid removed by filtration (1.4 g.). This had M.P. 150–3°. Two further crystallizations led to pure diol M.P. 162–3° with excellent recovery. The compound gave no test with ferric chloride solution and did not show an infrared absorption for an isolated ketone.

*Example II.—Preparation of dl-hydrocycloheximide acetate*

Dihydrocycloheximide (obtained by catalytic reduction of synthetic dehydrocycloheximide, prepared as described in Example I) (1.6 g.) was dissolved in 16 ml. of dry pyridine and the cooled solution (0° C.) was treated dropwise, while stirring and cooling, with 0.6 ml. of acetyl chloride (1.5 equivalents) in 25 ml. of methylene chloride. After stirring for 2 hours, at 0° C., the resulting solution was treated with 120 ml. of ice-cold water, and extracted with three 40 ml. portions of methylene chloride. The combined organic extracts were washed twice with 50 ml. portions of water and evaporated to dryness (rotovac). The thick colorless gummy residue, which solidified upon standing, was crystallized from ether and diluted alcohol giving long shining needles, M.P. 177.5–178°, yield, 1.0 g. Dihydrocycloheximide acetate was sparingly soluble in water, moderately soluble in ether and very soluble in acetone and alcohol. Its infrared spectrum showed characteristic bands at 2.81 m$\mu$, (OH), 3.10 m$\mu$, and 3.21 m$\mu$ (NH) 5.77 and 5.90 m$\mu$ (C:O), 7.90 m$\mu$, and 12.01 m$\mu$.

*Example III.—Preparation of dl-cycloheximide acetate*

One gram of the diol monoacetate, prepared as described in Example II, was dissolved in 100 ml. of 2% $CrO_3$ in 96% acetic acid, and the solution thus obtained was allowed to stand at room temperature (ca. 25° C.) for 3 hours. The reaction mixture was then treated with 300 ml. of ice-cold water, and extracted with three 50 ml. portions of methylene chloride. The combined organic extracts were washed with 50 ml. of water, excess of 5% sodium bicarbonate solution, and water (two 50 ml. portions) again. Evaporation of the solution to dryness (rotovac) gave a crystalline residue of cycloheximide acetate, which crystallized from aqueous alcohol or aqueous acetone as colorless prisms, M.P. 180–181°. Yield, 800 mg. Its infrared spectrum displayed characteristic bands at 3.11 and 3.22 mu (NH), 5.73, 5.77, 5.86 mu (C:O), and 7.88, 8.12, and 11.45 mu. Its infrared spectrum in chloroform solution was undistinguishable from that of cycloheximide acetate.

*Example IV.—Reduction of dehydroisocycloheximide*

Dehydroisocycloheximide (4.0 g.) in acetic acid (75 ml.) was stirred with platinum oxide (1.0 g.) in an atmosphere of hydrogen at 51 lbs. per sq. in. After four hours at room temperature the pressure had dropped to 19 lbs. per sq. in. and no further diminution in pressure occurred. The catalyst was then removed by filtration and the filtrate evaporated to dryness under reduced pressure. The glassy residue when recrystallized from ethyl acetate led to crystals in the form of plates, melting point 163 to 165° (2.7 g.) A second dimorphic form, melting point 172–173° was sometimes observed but these were inter-convertible by recrystallization from ethyl acetate and seeding of the solution with the appropriate form. Further recrystallization of either of these dimorphic forms from ethyl acetate did not noticeably affect the melting points, and it was possible to use them as such in further experimentation.

*Analysis.*—Calc. for $C_{15}H_{25}NO_4$: C, 63.6; H, 8.9; N, 4.9. Found: C, 63.6; H, 9.0; N, 5.0.

The infrared spectrum was also in accordance with a dialcohol.

*Example V.—Preparation of dihydro α-epi-isocycloheximide acetate*

The dialcohol (1.12 g.) product of Example IV was dissolved in pyridine (3 ml.) and cooled to 5° in an ice-bath. A solution of acetic anhydride (0.53 g.) in methylene chloride (1 ml.) was then added dropwise with stirring during 3 minutes. After the addition was complete, the solution was removed from the ice-bath and allowed to stand at room temperature overnight. The solvents and excess reagent were removed under reduced pressure using a vacuum pump, and the semi-crystalline residue was crystallized from either to give a crop of crystals in the form of plates (0.65 g.) melting point 165–170°. A further recrystallization from the same solvent gave the pure mono acetate, melting point 173–174° with excellent recovery.

*Analysis.*—Calc. for $C_{17}H_{27}NO_5$: C, 62.8; H, 8.4; N, 4.6. Found: C, 63.1; H, 8.3; N, 4.6.

The infrared spectrum of this material had a band at 2.8 m$\mu$ indicating the presence of a hydroxyl group.

*Example VI.—Preparation of dl-α-epi-isocycloheximide acetate*

The diol monoacetate (0.5 g.) product of Example V experiment was dissolved in acetic acid (10 ml.) and the solution cooled in an ice-bath. To this solution there was added with stirring a solution of chromium trioxide (0.4 g.) in acetic acid (1.5 ml.) and water (0.5 ml.) during two minutes with stirring. After standing at room temperature for three hours the mixture was diluted with isopropyl alcohol (2 ml.) and after further ten minutes poured into water (100 ml.). Extraction of this solution with methylene chloride (3 by 50 ml.) followed by washing the extract with a little sodium hydrogen carbonate solution, followed by drying over anhydrous magnesium sulfate led on removal of the solvent to a glass (0.5 g.). The latter crystallized well from a mixture of ether and methylene chloride to give dl-α-epi-isocycloheximide acetate (0.4 g.) of melting point of 166–168°. Further recrystallization from the same solvent mixture did not effect any increase in the melting point.

*Analysis.*—Calc. for $C_{17}H_{25}NO_5$: C, 63.1; H, 7.8; N, 4.3. Found: C, 62.9; H, 7.4; N, 4.6.

The infrared spectrum of this material in chloroform was identical in all respects with the chloroform solutions spectrum of a sample of optically active α-epi-isocycloheximide acetate.

*Examples VII–X*

Following the procedure of Examples I–III, and using the following dehydrocycloheximides in place of the reactant dl-dehydrocycloheximide of Example I, the corresponding cycloheximide esters are prepared:

3-[2-(3,5-dimethyl-2-hydroxycyclohexenyl-1)-2-oxoethyl]-3-methylglutarimide;
3-[2-(3,5-diethyl-2-hydroxycyclohexenyl-1)-2-oxoethyl]-3-glutarimide;
3-[2-(2-hydroxy-3-methylcyclohexenyl-1)-2-oxoethyl]-3-glutarimide;
3-[2-(2-hydroxy-5-butoxycyclohexenyl-1)-2-oxoethyl]-3-glutarimide.

The dialcohols, the monoacylated alcohols and the cycloheximide esters are biologically active. They may be used as fungicides and rodent repellents.

As many embodiments of this invention may be made without departing from the spirit and scope thereof, it is to be understood that the invention includes all such modifications and variations as come within the scope of the appended claims.

What is claimed is:
1. The process for preparing cycloheximide esters comprising
  (i) hydrogenating a dehydrocycloheximide having the formula

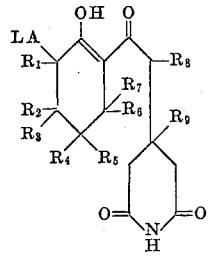

wherein LA is a lower alkyl and $R_1$ to $R_9$ are selected from the group consisting of hydrogen, lower alkyl, and lower alkoxy, to the dialcohol using a catalyst selected from the group consisting of platinum, rhodium, and nickel, in a solvent selected from the group consisting of organic acids, organic alcohols, and organic esters;
  (ii) monoacylating said dialcohol, by reacting one equivalent of an acylating agent with said dialcohol under basic conditions to obtain the monoester-alcohol; and
  (iii) oxidizing said monoester-alcohol by reacting said monoester-alcohol with an oxidizing agent in an inert solvent under acid conditions at a temperature below about 100° C., to obtain the cycloheximide ester.

2. The process of claim 1 wherein said base is selected from the group consisting of dimethylaniline, pyridine, and triethylamine and wherein said acylating agent is selected from the group consisting of acetyl chloride, acetic anhydride, and chloroacetyl chloride.

3. The process of claim 1 wherein the dehydrocycloheximide reactant is dehydrocycloheximide.

4. The process of claim 1 wherein the dehydrocycloheximide reactant is 3-[2-(3,5-dimethyl-2-hydroxycyclohexenyl-1)-2-oxoethyl]-3-methylglutarimide.

5. The process of claim 1 wherein the dehydrocycloheximide reactant is 3-[2-(3,5-diethyl-2-hydroxycyclohexenyl-1)-2-oxoethyl]-3-glutarimide.

6. The process of claim 1 wherein the dehydrocycloheximide reactant is 3-[2-(2-hydroxy-3-methylcyclohexenyl-1)-2-oxoethyl]-3-glutarimide.

7. The process of claim 1 wherein the dehydrocycloheximide reactant is 3-[2-(2-hydroxy-5-butoxycyclohexenyl-1)-2-oxoethyl]-3-glutarimide.

8. The process for preparing cycloheximide esters comprising
  (i) hydrogenating a dehydrocycloheximide having the formula

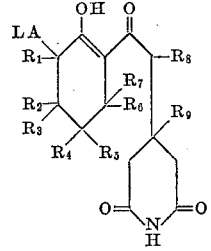

wherein LA is a lower alkyl and $R_1$ to $R_9$ are selected from the group consisting of hydrogen, lower alkyl, and lower alkoxy, to the dialcohol using a catalyst selected from the group consisting of platinum, rhodium, and nickel, in a solvent selected from the group consisting of organic acids, organic alcohols, and organic esters;
  (ii) monoacylating said dialcohol, by reacting p-toluenesulfonyl chloride with said dialcohol under basic conditions to obtain the monoester-alcohol; and (iii) oxidizing said monester-alcohol by reacting said monoester-alcohol with an oxidizing agent in an inert solvent under acid conditions at a temperature below about 100° C., to obtain the cycloheximide ester.

9. The process for preparing a 1-acyloxy-1-(2-hydroxy-3-lower alkylcyclohexyl)-2-(3-glutarimidyl)ethane comprising reacting a compound having the formula

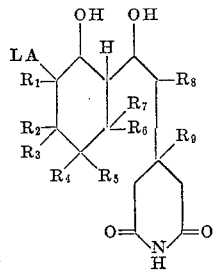

wherein LA is a lower alkyl and $R_1$ to $R_9$ are selected from the group consisting of hydrogen, lower alkyl, and lower alkoxy, with p-toluenesulfonyl chloride in a tertiary amine base.

References Cited by the Examiner
UNITED STATES PATENTS
3,095,418  6/1963  Rao _____ 260—281

OTHER REFERENCES

Fieser and Fieser: "Natural Products Related to Phenanthrene," Rheinhold, 1949, pages 231–3.

Kornfeld et al.: J. Am. Chem. Soc., vol. 7, pages 150–159 (1949).

ALEX MAZEL, *Primary Examiner.*

HENRY R. JILES, NICHOLAS S. RIZZO, *Examiners.*

DONALD G. DAUS, DON M. KERR,
*Assistant Examiners.*